United States Patent
Lupkes et al.

(10) Patent No.: US 7,500,348 B2
(45) Date of Patent: Mar. 10, 2009

(54) PULSE COMBUSTION DEVICE

(75) Inventors: Kirk R. Lupkes, Renton, WA (US); Gary L. Lidstone, Federal Way, WA (US)

(73) Assignee: United Technologies Corporation, Hartford, CT (US)

( * ) Notice: Subject to any disclaimer, the term of this patent is extended or adjusted under 35 U.S.C. 154(b) by 678 days.

(21) Appl. No.: 11/090,753

(22) Filed: Mar. 24, 2005

(65) Prior Publication Data

US 2006/0216662 A1  Sep. 28, 2006

(51) Int. Cl.
   *F02C 5/02* (2006.01)
(52) U.S. Cl. ........................ 60/39.38; 60/39.76
(58) Field of Classification Search ........... 60/247, 60/39.34, 39.38, 39.39, 39.76, 39.4
   See application file for complete search history.

(56) References Cited

U.S. PATENT DOCUMENTS

| | | | | |
|---|---|---|---|---|
| 2,705,867 | A * | 4/1955 | Lewis ................... | 60/39.34 |
| 2,942,412 | A * | 6/1960 | Bollay ................... | 60/247 |
| 3,417,564 | A | 12/1968 | Call | |
| 3,877,219 | A * | 4/1975 | Hagen ................... | 60/39.38 |
| 4,241,576 | A * | 12/1980 | Gertz ................... | 60/39.34 |
| 5,353,588 | A | 10/1994 | Richard | |
| 5,873,240 | A | 2/1999 | Bussing et al. | |
| 5,901,550 | A | 5/1999 | Bussing et al. | |
| 6,003,301 | A | 12/1999 | Bratkovich et al. | |
| 6,460,342 | B1 * | 10/2002 | Nalim ................... | 60/772 |
| 6,526,936 | B2 | 3/2003 | Nalim | |
| 6,584,765 | B1 * | 7/2003 | Tew et al. ................ | 60/249 |
| 6,901,738 | B2 * | 6/2005 | Sammann et al. .......... | 60/226.1 |
| 6,931,833 | B2 * | 8/2005 | Lupkes ................... | 60/207 |
| 6,981,365 | B1 * | 1/2006 | Johnson ................... | 60/247 |
| 7,047,724 | B2 * | 5/2006 | Nordeen et al. ........... | 60/226.1 |
| 7,062,901 | B1 * | 6/2006 | Johnson ................... | 60/247 |
| 7,100,360 | B2 * | 9/2006 | Sammann et al. .......... | 60/226.1 |
| 7,251,928 | B2 * | 8/2007 | Kojima et al. ............ | 60/247 |
| 2004/0123583 | A1 | 7/2004 | Nordeen et al. | |
| 2004/0154306 | A1 * | 8/2004 | Benians ................... | 60/776 |
| 2006/0213201 | A1 * | 9/2006 | Lupkes et al. ............ | 60/776 |
| 2006/0216662 | A1 * | 9/2006 | Lupkes et al. ............ | 431/1 |
| 2007/0157625 | A1 * | 7/2007 | Snyder et al. ............ | 60/776 |

* cited by examiner

*Primary Examiner*—William H Rodríguez
(74) *Attorney, Agent, or Firm*—Bachman & LaPointe, P.C.

(57) ABSTRACT

A pulse combustion device has a number of combustors with upstream bodies and downstream nozzles. Coupling conduits provide communication between the combustors. For each given combustor this includes a first communication between a first location upstream of the nozzle thereof and a first location along the nozzle of another. There is second communication between a second location upstream of the nozzle and a second communication between a second location upstream of the nozzle of a second other combustor and a second nozzle location along the nozzle of the given combustor.

21 Claims, 4 Drawing Sheets

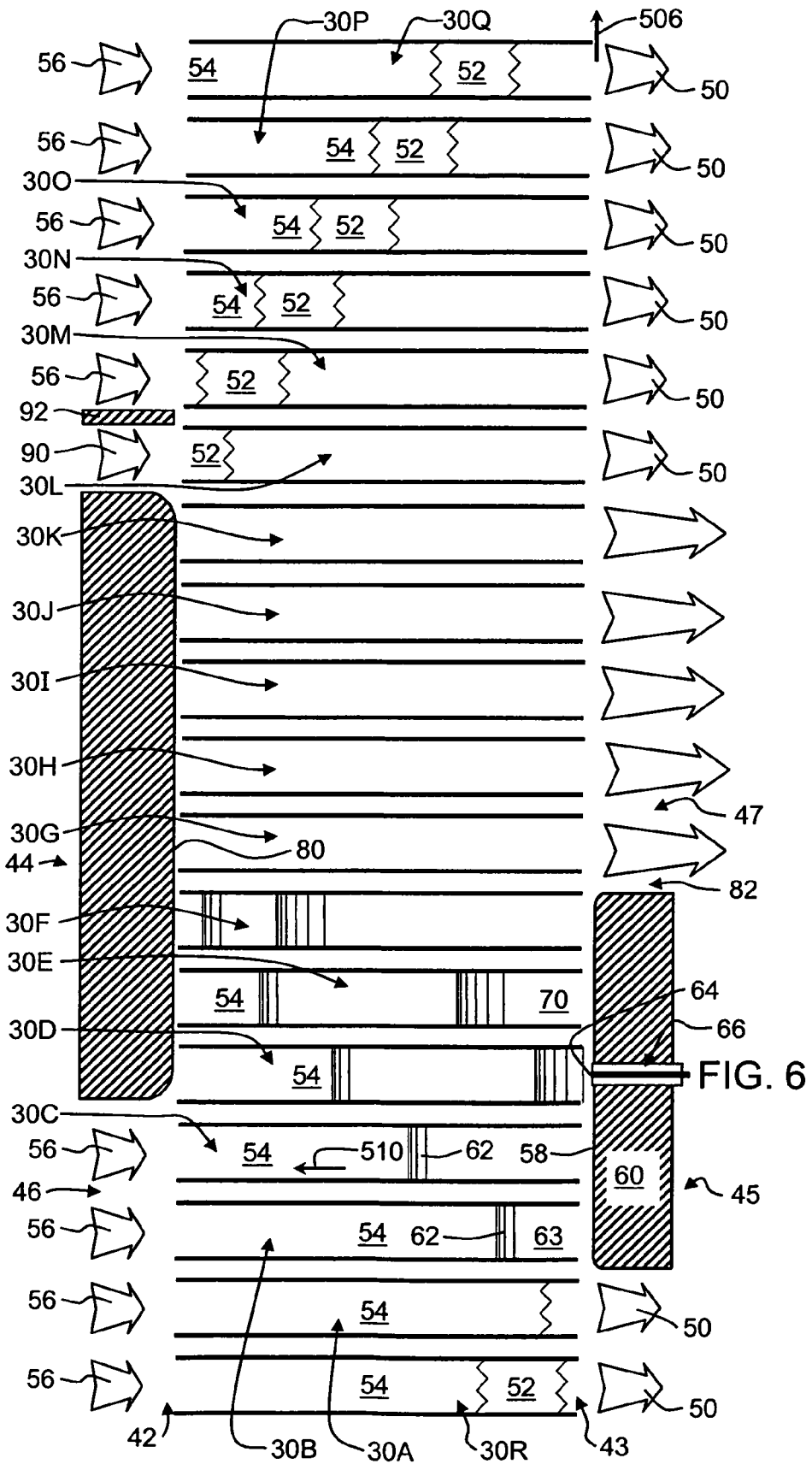

PULSE COMBUSTION DEVICE

BACKGROUND OF THE INVENTION

This invention relates to pulse combustion devices, and more particularly to pulse combustion engines.

Diverse pulse combustion technologies exist. Pulse detonation engines (PDE's) represent areas of particular development. In a generalized PDE, fuel and oxidizer (e.g. oxygen-containing gas such as air) are admitted to an elongate combustion chamber at an upstream inlet end. The air may be introduced through an upstream inlet valve and the fuel injected downstream thereof to form a mixture. Alternatively, a fuel/air mixture may be introduced through the valve. Upon introduction of this charge, the valve is closed and an igniter is utilized to detonate the charge (either directly or through a deflagration to detonation transition process). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion as distinguished, for example, from constant pressure combustion. Exemplary pulse combustion engines are shown in U.S. Pat. Nos. 5,353,588, 5,873,240, 5,901,550, and 6,003,301.

Additionally, pulse combustion devices have been proposed for use as combustors in hybrid turbine engines. For example, the device may replace a conventional turbine engine combustor. Such proposed hybrid engines are shown in U.S. Pat. No. 3,417,564 and U.S. Publication 20040123583 A1.

BRIEF SUMMARY OF THE INVENTION

One aspect of the invention involves a pulse combustion device having a circular array of combustion conduits. Each conduit includes a wall surface extending from an upstream inlet to a downstream outlet. At least one valve is positioned to admit at least a first gas component of a propellant to the combustion conduit inlets. The device includes an outlet end member. The array and outlet end member are rotatable in at least a first direction relative to each other. Means are provided at least partially in the outlet end member for providing a circumferentially varying effective nozzle geometry.

In one or more implementations, the means may provide a circumferentially varying effective throat area. The outlet end member may be essentially fixed and the array may rotate. Alternatively, the array may be essentially fixed and the outlet end member may rotate. The means may include a passageway through the outlet end member. The outlet end member may further include an igniter. The inlet valve may comprise an inlet end member non-rotating relative to the outlet end member.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6 is a partially schematic unwrapped longitudinal circumferential sectional view of the combustor of the engine of FIG. 1.

Like reference numbers and designations in the various drawings indicate like elements.

DETAILED DESCRIPTION

Figure 1:
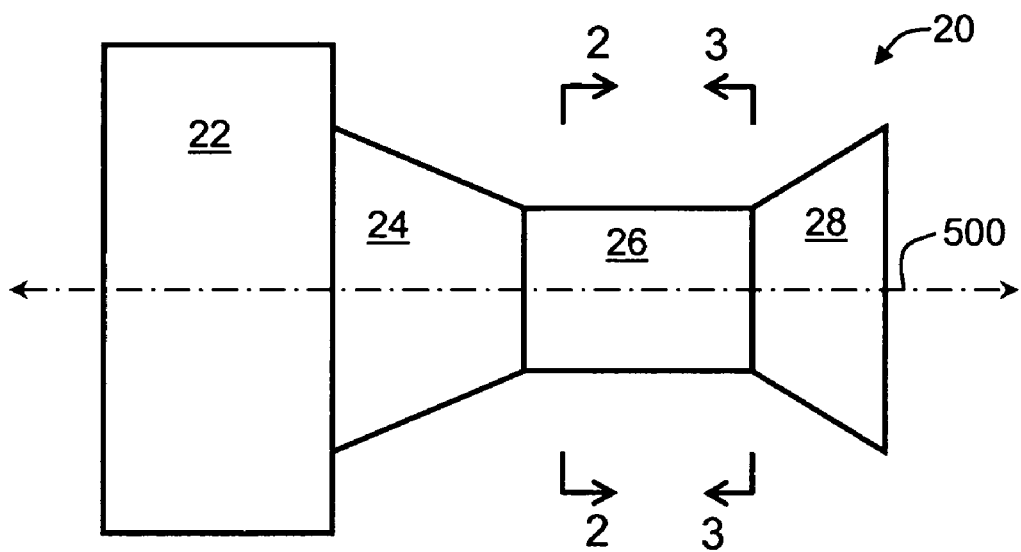
FIG. 1 is a schematic side view of a gas turbine engine.
Figure 2:
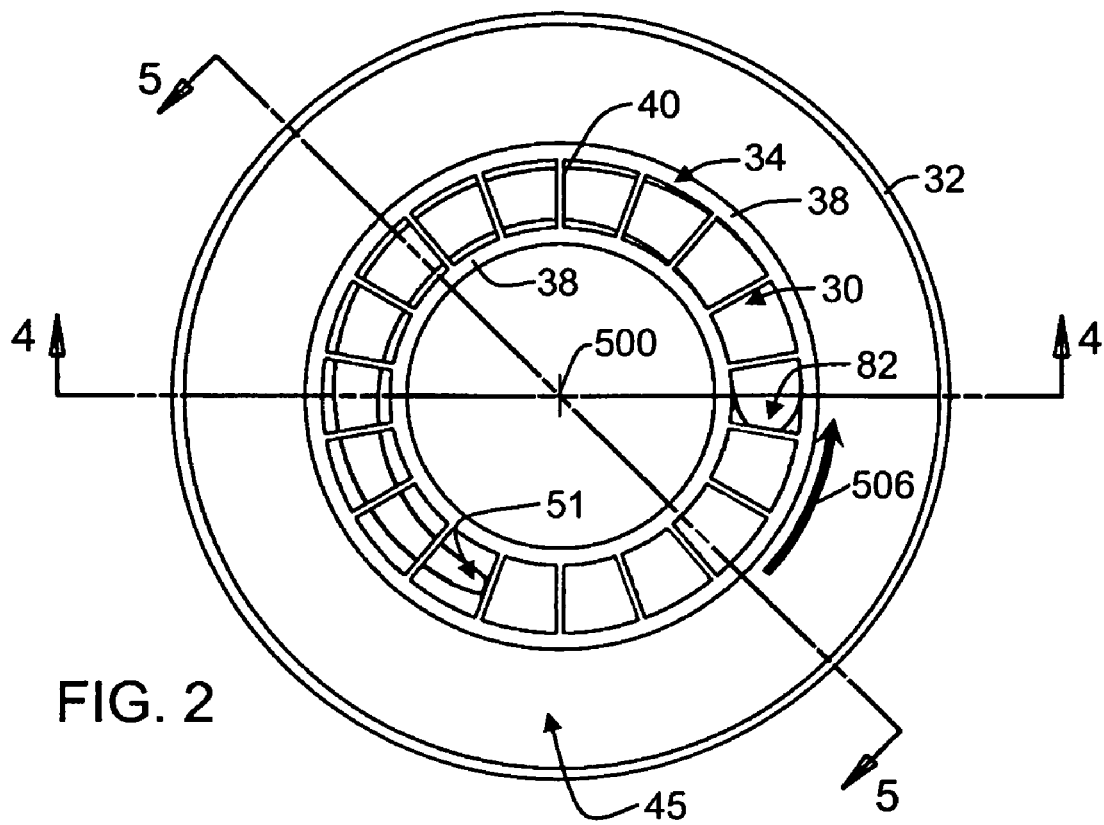
FIG. 2 is a sectional view of a combustor of the engine of FIG. 1, taken along line 2-2.

FIG. 1 shows a gas turbine engine 20 having a central longitudinal axis 500. From upstream to downstream, the exemplary engine 20 includes a fan section 22, at least one compressor section 24, a pulse combustion combustor section 26, and a turbine section 28. The exemplary combustor 26 includes a circumferential array of longitudinally-extending conduits 30 (FIG. 2) mounted within an engine case 32 for rotation about the axis 500 (e.g., supported or formed on a carousel structure 34 which may be on one of the compressor/turbine spools or a separate free spool).

The exemplary combustor array includes eighteen combustor conduits 30 (shown for illustration as straight passages oriented longitudinally and having a transverse cross-section of an annular sector). Alternative cross-sections including circular sections are possible, as are non-longitudinal orientations and non-straight configurations. The direction of rotation is labeled as 506. The exemplary passageways are formed between inner and outer walls 36 and 38 spanned by radial walls 40.

FIG. 6 shows further details of the exemplary combustor 26 during steady-state operation. Positions of the conduits at an exemplary point in the cycle are respectively designated as 30A-30R. Each exemplary conduit 30 has an upstream inlet 42 and a downstream outlet 43. For ease of reference, the conduits will be identified by the reference numerals associated with the illustrated positions. Fixed inlet (upstream) and outlet (downstream) end members 44 and 45 are positioned respectively upstream and downstream of the conduit array and have respective open areas 46 and 47 for admitting gas to the conduits and passing gas from the conduits. As is discussed in further detail below, member 45 serves as a nozzle structure and its open area 47 serves as a nozzle aperture.

At the illustrated instance in time, a last bit of a purge flow 50 of combustion products is exiting the outlet 43 of the conduit 30A at a first end 51 of the open area 47. A slug of a buffer gas 52 is in a downstream end portion of the conduit 30A following right behind the purge flow 50. A propellant charge 54 follows behind the buffer slug 52, being delivered by a propellant fill flow 56 through the inlet 42. An exemplary propellant flow includes a gaseous oxidizer (e.g., air) and a fuel (e.g., a gaseous or liquid hydrocarbon). In the exemplary turbine engine embodiment, the air may be delivered from the compressor 24 and the fuel may be introduced by fuel injectors (not shown).

At the illustrated point in time, the next conduit 30B has just had its outlet closed by passing in front of an upstream face 58 along a blocking portion 60 of the downstream member/nozzle 45. At the point of closure/occlusion, some or all of the buffer slug 52 may have exited the conduit outlet. The buffer slug 52 serves to prevent premature ignition of the charge 54 due to contact with the combustion gases. The closure of the outlet port causes a compression wave 62 to be sent in a forward/upstream direction 510 through the charge 54 leaving a compressed portion 63 of said charge in its wake.

This compression process continues through the position approximately shown for conduit 30C. At some point (e.g., as shown for the conduit 30D) the conduit outlet becomes exposed to the operative end 64 of an ignition source 66 (e.g., a spark ignitor in the member 45). The ignitor 66 ignites the compressed charge 63 causing detonation and sending a detonation wave 68 forward/upstream after the compression wave 62 (e.g., as shown for conduits 30D, 30E, and 30F). The combustion products 70 are left in the wake of the detonating wave.

A surface 80 of a main portion of the combustor upstream member 44 is positioned to block the conduit inlets during a main portion of the combustion process. In the exemplary implementation, the surface 80 (a downstream face) is positioned to block the inlets 42 to prevent upstream expulsion of the charge 54 as the compression wave 62 approaches. The surface 80 is also positioned to prevent upstream discharge of combustion products during a high pressure interval thereafter. An exemplary circumferential extent of the surface 80 is between 40° and 160° (more narrowly, 90° and 120°).

In the exemplary combustor, there is a brief interval shown for the conduits 30D, 30E, and 30F wherein both its inlet and outlet are blocked after the outlet been exposed to the ignitor. Alternative configurations may lack this interval. Shortly thereafter (e.g., as shown for the conduit 30G) the conduit outlet clears the surface 58 at a second end 82 of the open area 47 and is thus opened. A blow down flow 84 of high pressure combustion gases then exits the conduit outlet. This blow down interval may continue (e.g., for the conduits shown as 30G, 30H, 30I, 30J, and 30K).

After the blow down interval, there may be a buffer filling interval wherein an inlet buffer flow 90 generates the buffer slug 52 upstream of the combustion gases 70. The exemplary flow 90 may be of unfueled air. In the exemplary combustor, this flow 90 is isolated from the flow 56 by a narrow segment 92 of the upstream member 44 (thereby defining a port through which the flow 90 passes). Alternative configurations could lack such a segment 92 and rely on injector positioning to keep the flow 90 relatively unfueled. Thereafter, through several further stages (e.g., for conduits 30M, 30N, 300, 30P, 30Q, 30R, and finally returning to 30A, 30B, and 30C) the conduit may be recharged with propellant.

Figure 3:
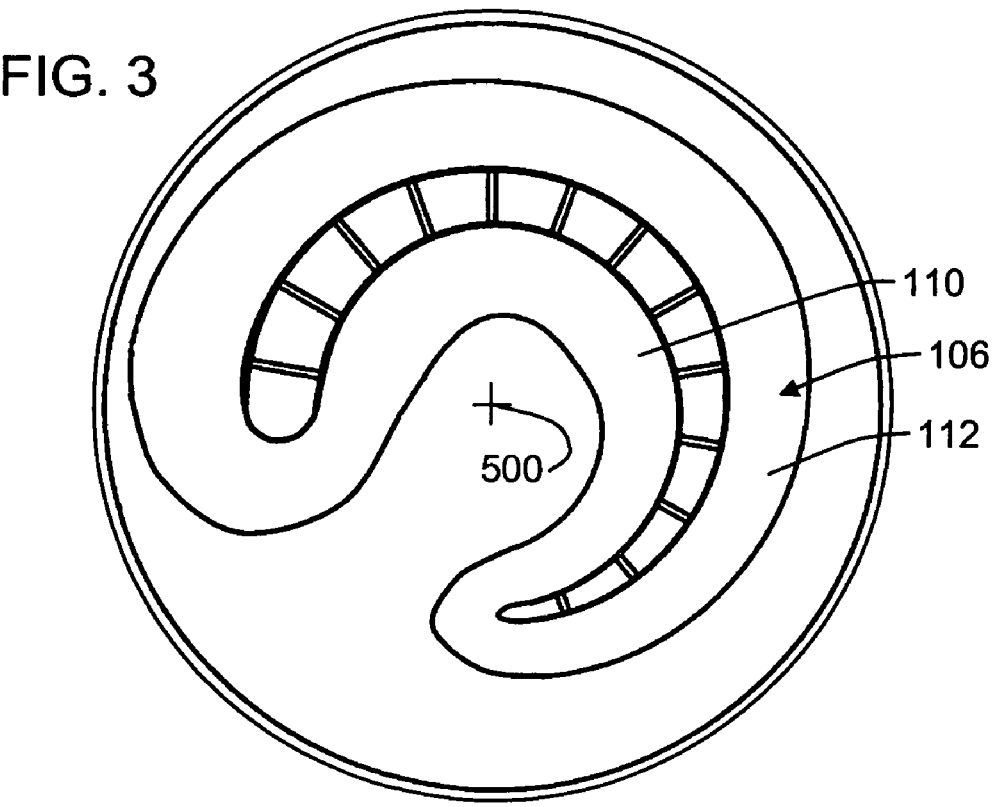
FIG. 3 is a sectional view of a combustor of the engine of FIG. 1, taken along line 3-3.
Figure 4:
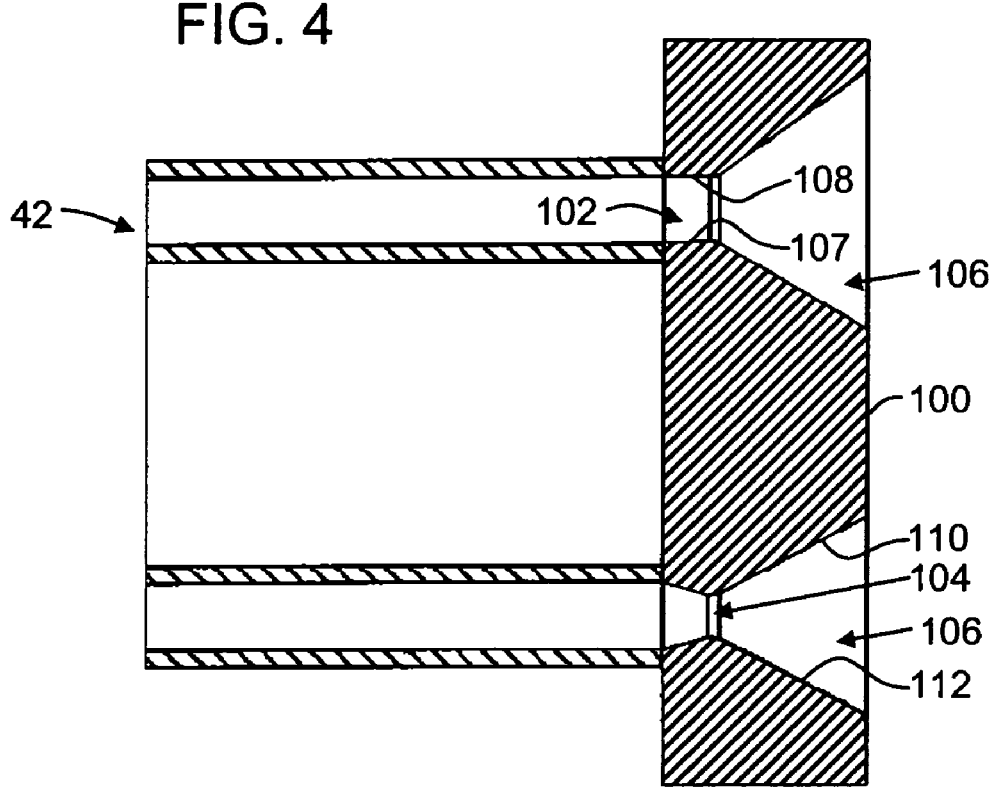
FIG. 4 is a longitudinal sectional view of a conduit array and nozzle of the combustor of FIG. 2, taken along line 4-4.
Figure 5:
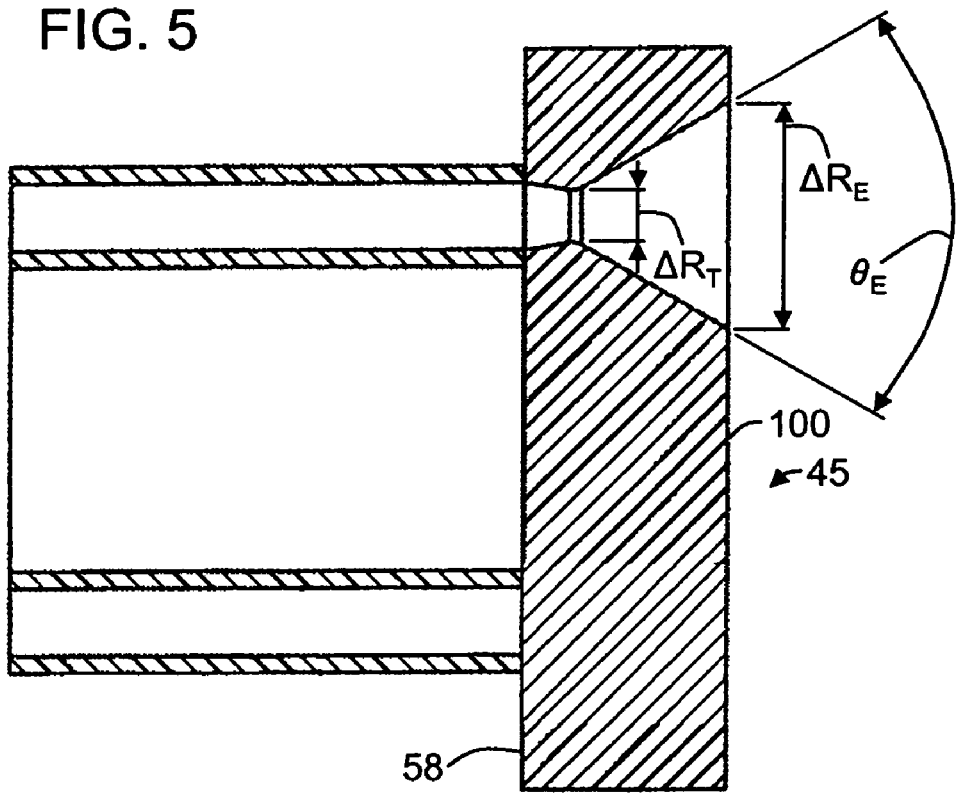
FIG. 5 is a longitudinal sectional view of a conduit array and nozzle of the combustor of FIG. 2, taken along line 5-5.

Further details of the downstream member 45 can be seen in FIGS. 3-5. In the exemplary somewhat schematic illustration, the downstream member has a downstream face 100 generally radially extending. From the upstream face 58 to the downstream face 100, the open area 47 defines a convergent-divergent nozzle (FIG. 4) characterized by a convergent (flow contraction) portion 102, a throat portion 104, and a divergent (flow expansion) portion 106. The exemplary convergent portion 102 is characterized by inboard and outboard surface portions 107 and 108 of a circumferentially elongate upstream channel. Viewed in central longitudinal section, the exemplary portions 107 and 108 are straight and downstream convergent toward each other. Similarly, the exemplary divergent portion 106 is characterized by inboard and outboard surface portions 110 and 112 of a circumferentially elongate downstream channel. Viewed in central longitudinal section, the exemplary portions 110 and 112 are straight and downstream divergent away from each other. Sectionally convex throat transitions join the surface portion 107 to the surface portion 110 and the surface portion 108 to the surface portion 112. Other nozzle shapes (e.g., curved or otherwise contoured surface portions) are possible.

Figure 7:
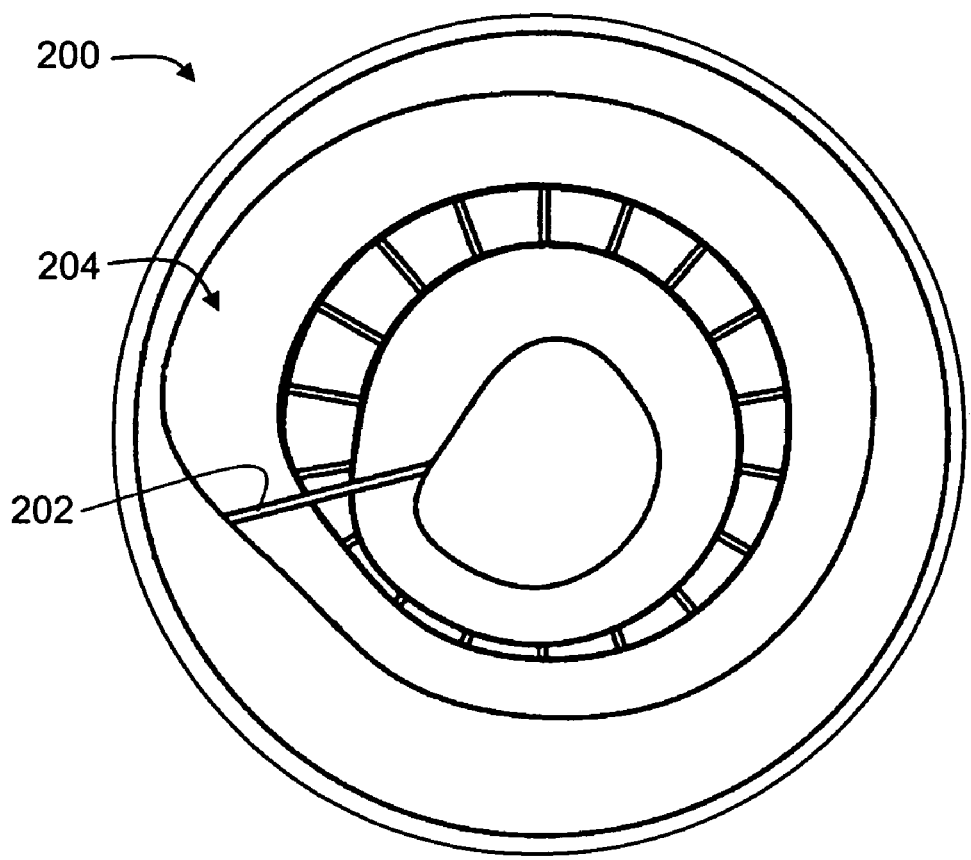
FIG. 7 is rear view of an alternative nozzle.

According to the present invention, the effective nozzle properties may vary circumferentially. In the exemplary embodiment, the effective throat area may be varied by varying the throat radial span ART. The effective exit area may be varied by varying the exit radial span $\Delta R_E$. The effective exit angle may be varied by varying longitudinal/radial angle $\theta_E$ between the surface portions 110 and 112. There may be similar control of the properties of the convergent portion 102. Other parameters may be varied. In the exemplary nozzle, the radial span ART generally decreases in the direction of rotation 506 (e.g., from near the second end 82 to near the first end 47). The change may be stepwise or smoothly continuous. The change occurs over a greater circumferential span than the technical incidental and transient change from a conduit passing from a blocked area to a nozzle area that remains constant for the rest of the discharge cycle. The change may take place over a major portion of the cycle (e.g., at least 180° of a single cycle per revolution configuration). More broadly, the change may take place over an area between a third of a cycle and a full cycle. FIG. 7 shows a full cycle change in a nozzle 200 effectively eliminating the blocking of the conduit outlets. A divider wall 202 in the nozzle divergent section 204 helps block any backflow of high pressure exhaust products into the adjacent tube purging at a lower pressure.

In steady-state operation, the rotation may be driven by aerodynamic factors (e.g., from a slight tangential orientation of the conduits). At start-up, engine spool rotation may be commenced by conventional drive (e.g., pneumatic, electric, or starter cartridge). Operation of the exemplary combustor may tend to be self-timing. However, additional timing control may be provided. For example, means may be provided to change the relative phases of the downstream and upstream members 44 and 45 (e.g., by shifting their orientational phase about the axis 500). Alternatively, means may be provided for varying the attributes of either of these members individually. For example, there may be multiple open areas in the downstream member 45 or a single passageway may have multiple outlets or inlets which may be selectively opened or closed individually or in combinations. Similarly, the circumferential extent of blocking provided by the upstream member 82 might be made adjustable as might be the circumferential extents and positions of the respective fueled and unfueled flows 56 and 90.

In alternative embodiments, the conduit array may be fixed and at least the downstream member may be rotating. An upstream member rotating synchronously with the downstream member will provide a similar operation as discussed above for FIG. 6. However, the valving interaction of the upstream member with the conduits could easily be replaced with discrete valves at the inlet ends of each conduit. Such discrete valves would provide greater flexibility in timing control of the combustion process.

One or more embodiments of the present invention have been described. Nevertheless, it will be understood that various modifications may be made without departing from the spirit and scope of the invention. For example, even with the basic construction illustrated, many parameters may be utilized to influence performance. Accordingly, other embodiments are within the scope of the following claims.

What is claimed is:

1. A pulse combustion device comprising:
    a circular array of combustion conduits, each comprising a wall surface extending from an upstream inlet to a downstream outlet;
    at least one inlet valve positioned to admit at least a first gas to the combustion conduit inlets; and an outlet end member, the array and outlet end member rotatable in at least a first direction relative to each other, the outlet end member forming a nozzle having a circumferentially varying geometry including: a circumferentially varying characteristic ratio of inlet radial span to throat radial span varying along a sector corresponding to between a third of cycle and a full cycle.

2. The device of claim 1 wherein the circumferentially varying geometry includes a throat with a circumferentially varying radial span.

3. The device of claim 1 wherein the circumferentially varying geometry includes an expansion surface with a circumferentially varying characteristic angle of divergence.

4. The device of claim 1 wherein the circumferentially varying geometry includes an expansion surface with a circumferentially varying characteristic ratio of exit radial span to throat radial span.

5. The device of claim 1 wherein the circumferentially varying geometry includes an exit with a circumferentially varying radial span.

6. The device of claim 1 wherein outlet end member includes at least one closed sector of between 30° and 120° and the circumferentially varying geometry varies along a remaining sector in at least one of a stepwise fashion and a continuous fashion.

7. The device of claim 1 wherein said conduits are arrayed in a circle about a central longitudinal axis of the device.

8. The device of claim 1 wherein there are between ten and fifty said conduits, inclusive.

9. The device of claim 1 wherein there are between fifteen and twenty-five said conduits, inclusive.

10. The device of claim 1 wherein the outlet member further includes: an ignitor.

11. A turbine engine comprising:
a central longitudinal axis;
a compressor;
a turbine; and
the pulse combustion device of claim 1 coaxial with the compressor and turbine along the central longitudinal axis and downstream of the compressor and upstream of the turbine.

12. A pulse combustion device comprising:
a circular array of combustion conduits, each extending from an upstream inlet to a downstream outlet;
at least one inlet valve positioned to admit at least a first gas component of a propellant to the combustion conduit inlets;
an outlet end member, the array and outlet end member rotatable in at least a first direction relative to each other; and
means at least partially in the outlet end member for providing a circumferentially varying effective nozzle geometry including a circumferentially varying throat radial span.

13. The device of claim 12 wherein the means provide a circumferentially varying effective throat area.

14. The device of claim 12 wherein the outlet end member is essentially fixed and the array rotates.

15. The device of claim 12 wherein the array is essentially fixed and the outlet end member rotates.

16. The device of claim 12 wherein the means comprises a passageway through the outlet end member.

17. The device of claim 12 wherein the outlet member farther includes: an ignitor.

18. The device of claim 12 used as a turbine engine combustor, the device being coaxial with a compressor and turbine and downstream of the compressor and upstream of the turbine.

19. A method for operating a pulse combustion device, the device comprising:
a plurality of combustor conduits, each comprising:
an upstream inlet; and
a downstream outlet, the method comprising:
rotating the plurality of combustor conduits as a unit relative to a nozzle of circumferentially varying properties;
cyclically:
admitting a fuel/oxidizer mixture into each conduit through its inlet; and
discharging products of combustion of said mixture from the outlet of such conduit, during said discharge, the products passing through said nozzle and said circumferentially varying properties including: a circumferentially varying characteristic ratio of inlet radial span to throat radial span varying along a sector corresponding to between a third of cycle and a full cycle.

20. The method of claim 19 wherein the circumferentially varying properties include an effective throat area.

21. A pulse combustion device comprising:
a circular array of combustion conduits, each extending from an upstream inlet to a downstream outlet;
at least one inlet valve positioned to admit at least a first gas component of a propellant to the combustion conduit inlets;
an outlet end member, the array and outlet end member rotatable in at least a first direction relative to each other, the outlet end member including an ignitor; and
means at least partially in the outlet end member for providing a circumferentially varying effective nozzle geometry including a throat with a circumferentially varying radial span.

* * * * *